US009401802B2

(12) United States Patent
Card

(10) Patent No.: US 9,401,802 B2
(45) Date of Patent: Jul. 26, 2016

(54) SIDE CHANNEL POWER ATTACK DEFENSE WITH PSEUDO RANDOM CLOCK OPERATION

(71) Applicant: Fairchild Semiconductor Corporation, San Jose, CA (US)

(72) Inventor: Robert A. Card, Scarborough, ME (US)

(73) Assignee: FAIRCHILD SEMICONDUCTOR CORPORATION, San Jose, CA (US)

(*) Notice: Subject to any disclaimer, the term of this patent is extended or adjusted under 35 U.S.C. 154(b) by 0 days.

(21) Appl. No.: 14/447,792

(22) Filed: Jul. 31, 2014

(65) Prior Publication Data

US 2015/0039910 A1 Feb. 5, 2015

Related U.S. Application Data

(60) Provisional application No. 61/860,594, filed on Jul. 31, 2013.

(51) Int. Cl.
| | | |
|---|---|---|
| *H04L 9/22* | (2006.01) | |
| *G06F 12/14* | (2006.01) | |
| *H04L 9/00* | (2006.01) | |
| *G09C 1/00* | (2006.01) | |

(52) U.S. Cl.
CPC ........ *H04L 9/003* (2013.01); *G09C 1/00* (2013.01); *H04L 2209/08* (2013.01); *H04L 2209/12* (2013.01)

(58) Field of Classification Search
CPC ....... H04L 9/22; H04L 9/003; H04L 2209/12; H04L 2209/08; H04L 9/002; G06F 12/1408; G06F 21/602; G06F 21/558; G06F 21/76; G06F 21/77; G06F 21/75; G06F 21/554; G06F 21/72; G06F 2207/7223; G06F 9/3836; G09C 1/00
USPC .......................................... 713/193, 300–340
See application file for complete search history.

(56) References Cited

U.S. PATENT DOCUMENTS

| | | | | |
|---|---|---|---|---|
| 6,419,159 B1* | 7/2002 | Odinak | ................. | G06F 21/558 235/492 |
| 7,318,145 B1* | 1/2008 | Stribaek | .............. | G06F 9/30072 712/219 |
| 7,428,643 B2* | 9/2008 | Janke | ....................... | G06F 1/206 713/194 |
| 7,911,247 B2* | 3/2011 | Xu | ......................... | H03L 7/1974 327/156 |
| 2002/0131596 A1* | 9/2002 | Boeckeler | ............. | G06F 21/558 380/252 |
| 2004/0177215 A1* | 9/2004 | Nagamasa | ............ | G06F 21/602 711/103 |
| 2004/0228190 A1* | 11/2004 | Kunemund | ............ | G06K 19/07 365/202 |
| 2004/0260932 A1* | 12/2004 | Blangy | ................. | G06F 21/558 713/189 |
| 2007/0214335 A1* | 9/2007 | Bellows | ............... | G11C 7/1012 711/167 |
| 2008/0189555 A1* | 8/2008 | Sohn | ...................... | G06F 21/558 713/192 |
| 2011/0085681 A1* | 4/2011 | Hashimoto | ............ | H03G 7/007 381/107 |
| 2011/0285420 A1* | 11/2011 | Deas | ....................... | H04L 9/003 326/8 |
| 2011/0285421 A1* | 11/2011 | Deas | ...................... | H04L 7/0337 326/8 |
| 2013/0151842 A1* | 6/2013 | Yu | ........................... | H04L 9/003 713/150 |
| 2014/0044265 A1* | 2/2014 | Kocher | ..................... | H04L 9/30 380/277 |
| 2015/0006913 A1* | 1/2015 | Daniel | .................. | G06F 21/602 713/193 |

OTHER PUBLICATIONS

S. Yang, W. Wolf, N. Vijaykrishnan, D.N. Serpanos and Y. Xie "Power attack resistant cryptosystem design: a dynamic voltage and frequency switching approach"; Proceedings of the Design, Automation and Test in Europe Conference and Exhibition, 2005, IEEE, 6 pages.*

* cited by examiner

*Primary Examiner* — Catherine Thiaw
(74) *Attorney, Agent, or Firm* — Schwegman Lundberg & Woessner, P.A.

(57) ABSTRACT

Apparatus and methods are provided for defending an electronic circuit secret algorithm and secret parameter values against a side-attack. In an example, a method can include receiving first one or more parameters for altering a clock signal of the electronic device at a non-volatile memory register, and altering a frequency of the clock signal of the electronic device during execution of an authentication routine according to the first one or more parameters.

14 Claims, 4 Drawing Sheets

SIDE CHANNEL POWER ATTACK DEFENSE WITH PSEUDO RANDOM CLOCK OPERATION

PRIORITY AND RELATED APPLICATIONS

This application claims the benefit of priority under 35 U.S.C. 119 to Card, U.S. Provisional Patent Application No., 61/860,594, filed on Jul. 31, 2013, titled, SIDE CHANNEL POWER ATTACK DEFENSE WITH PSEUDO RANDOM CLOCK FREQUENCY & CLOCK STRETCHING, which is hereby incorporated by reference herein it its entirety.

BACKGROUND

As electronic data exchange has developed, so to have nefarious techniques for acquiring data and use of exchange equipment without the data owner's or the equipment owner's permission. As the capabilities of the equipment and data accessible therefrom has become more valuable, techniques to defend against unauthorized access to the data, unauthorized access to electronic systems, sale and distribution of counterfeit electronic components has also developed. Some techniques for providing protection from unauthorized access or use of an electronic system include encoding data transfers between components of a system. In certain examples, encoding can employ using a secret key with an encoding algorithm to conceal the actual operation of an electronic system and thus attempt to prevent unauthorized access or use of the electronic system. However, side attack techniques have also been developed that passively monitor power or electromagnetic signals of a circuit to derive circuit algorithms or parameter values such as encryption key values.

OVERVIEW

This application discusses, among other things, apparatus and methods for defending an electronic circuit secret algorithm and secret parameter values against a side-attack. In an example, a method can include receiving first one or more parameters for altering a clock signal of the electronic device at a non-volatile memory register, and altering a frequency of the clock signal of the electronic device during execution of an authentication routine according to the first one or more parameters.

This overview is intended to provide an overview of subject matter of the present patent application. It is not intended to provide an exclusive or exhaustive explanation of the invention. The detailed description is included to provide further information about the present patent application.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

Figure 1:
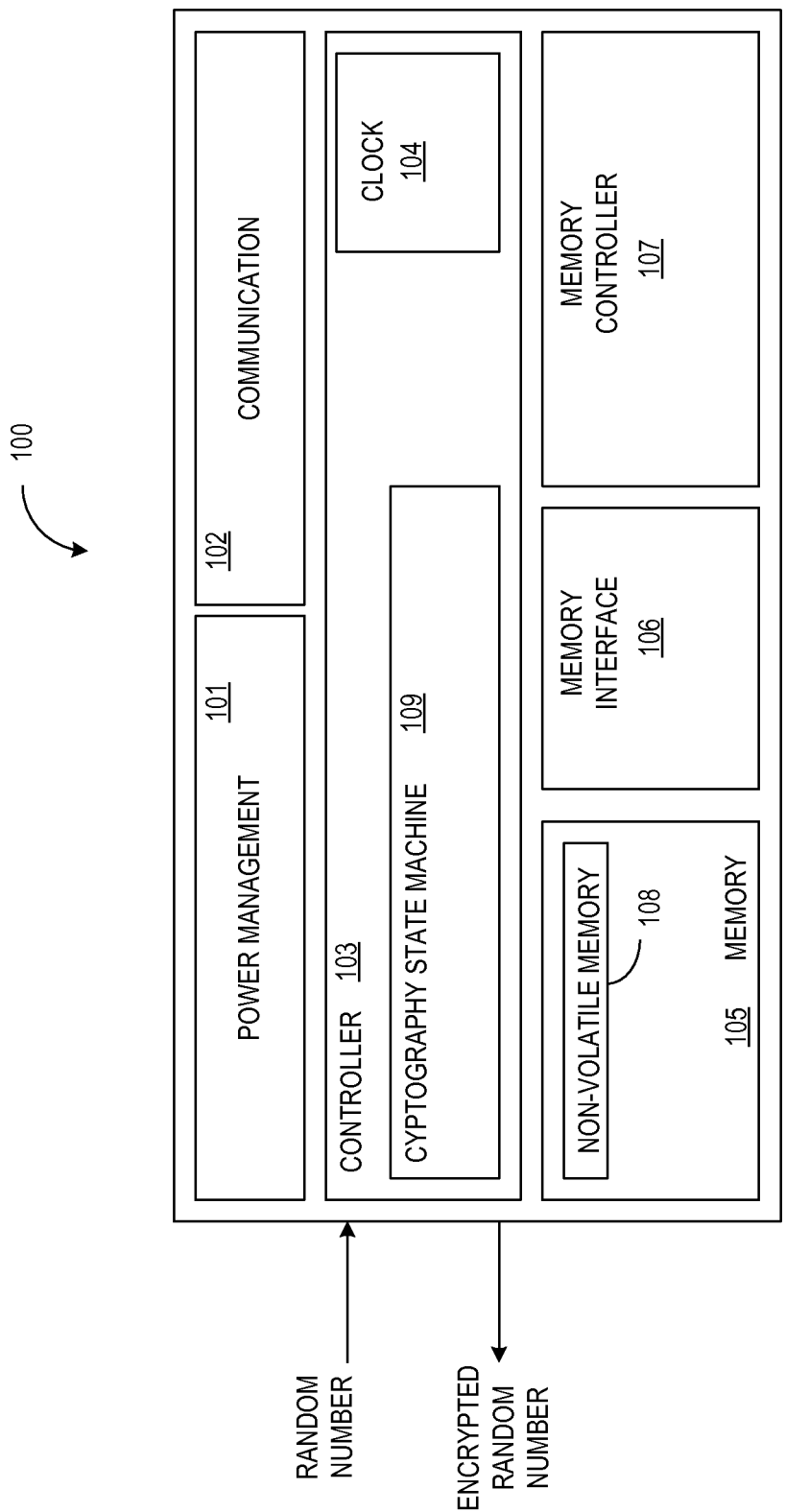
FIG. 1 illustrates generally an example device.

FIG. 1 illustrates generally an example device 100 within an authentication system. The device 100 can be a master in the authentication system or can be a slave within the authentication system. In certain examples, the device 100 can include a power management circuit 101, a communication circuit 102, a controller 103, a clock 104, memory 105, a memory interface 106, and a memory controller 107. The power management circuit 101 can receive power from a source and can distribute the power to components of the device 100 at the proper voltage while monitoring and modulating power flow to provide efficient operation and to avoid damage. In certain examples, the communication circuit 102 can provide an interface between the controller 103 and other devices using wired or wireless connections. In certain examples, the controller 103 can execute programs stored in the memory 105 to provide the device functionality. In certain examples, the clock 104 can provide a pacing signal to the controller 103 and other components to facilitate program execution and to coordinate information transfer between components of the device 100 as well as information transfer between the device 100 and other devices. The memory 105 can store program instructions and parameters that guide the operation of the device 100. The memory controller 107 and memory interface 106 can facilitate the transfer of information between the memory 105 and other components of the device 100. In certain examples, the memory 105 can include non-volatile memory 108 for storing information. In certain examples, non-volatile memory 108 can be used to store secret keys for authentication. In some examples, the non-volatile memory 108 can be used to store other information such as manufacturer identification (ID) parameters.

In some examples, the device 100 can include user interface devices such as a screen, a keyboard or a pointing device. In some examples, the device 100 can include additional interface components such as sensors or indicators. In certain examples, the device 100 can be coupled to one or more other devices. As discussed above, certain situations may exist that authentication is required before the device 100 can operate with other devices either to provide additional functionality to the other devices or to extend the functionality of the device 100 using the other devices. In such situations, the device 100 can use the secret keys to implement an authentication protocol. The secret keys can be stored in non-volatile memory 108 and can be used by a cryptographic controller, or cryptographic state machine 109, to assist in an authentication method. Concealment of the secret keys or the encryption keys can provide security of the device and the data thereon as well as ensure that only quality, licensed accessory components are used to extend device functionality. As discussed above, secret keys and encryption keys have been employed with an encoding algorithm to conceal the actual operation of an electronic system and thus prevent unauthorized access or use of the electronic system. For example, in some authentication routines, a random number can be received at the device 100. Upon reception of the random number, a cryptography state machine 109 can retrieve a key from the non-volatile memory 108 and can encode the random number to provide an encrypted random number. The encrypted random number can be sent back to the device that provided the random number for authentication of the slave device.

The access of the key from non-volatile memory has recently been identified as a particularly vulnerable time during which power or EMI analysis can be used to identify the operation of the cryptography state machine and the key(s). Even sophisticated encoding and secret key type security systems have become vulnerable to attack. Power analysis and EMI analysis techniques of an electronic system are examples of techniques currently being used to decode security algorithms and identify secret keys used to encode data exchanged between components of an integrated circuit. Power analysis is based on the principle that as an electronic circuit or system operates, it will consume different amounts of energy depending on the function it is performing. EMI analysis is based on the principle that electrical current flow and changes of current flow through a conductor will radiate electromagnetic interference. A hacker can use a power probe or an EMI probe to capture power consumption data and EMI data about the operation of a circuit or system. The data can be analyzed and compared to reference data to identify known encryption or cytological algorithms. Once an encryption or cryptologic algorithm is identified, the hacker can use the collected data to identify when an encryption key is accessed. Further analysis can then identify one or more actual encryption or secret keys. Once a hacker is able to identify an encryption key, the hacker can use the circuit or system in ways that may be counterproductive to the system's owner or to others. Such activities can include but are not limited to accessing and controlling the data and assets of others, defeating electronic security for example for the purpose of committing fraud, piracy, counterfeiting, or combinations thereof. Power analysis and EMI analysis of some electronic circuits or systems can sometimes be referred to as side channel attacks.

The present inventor has recognized a method to defend against side channel attacks by concealing the activities of a circuit or an electronic system from a power or EMI analysis.

Figure 2:
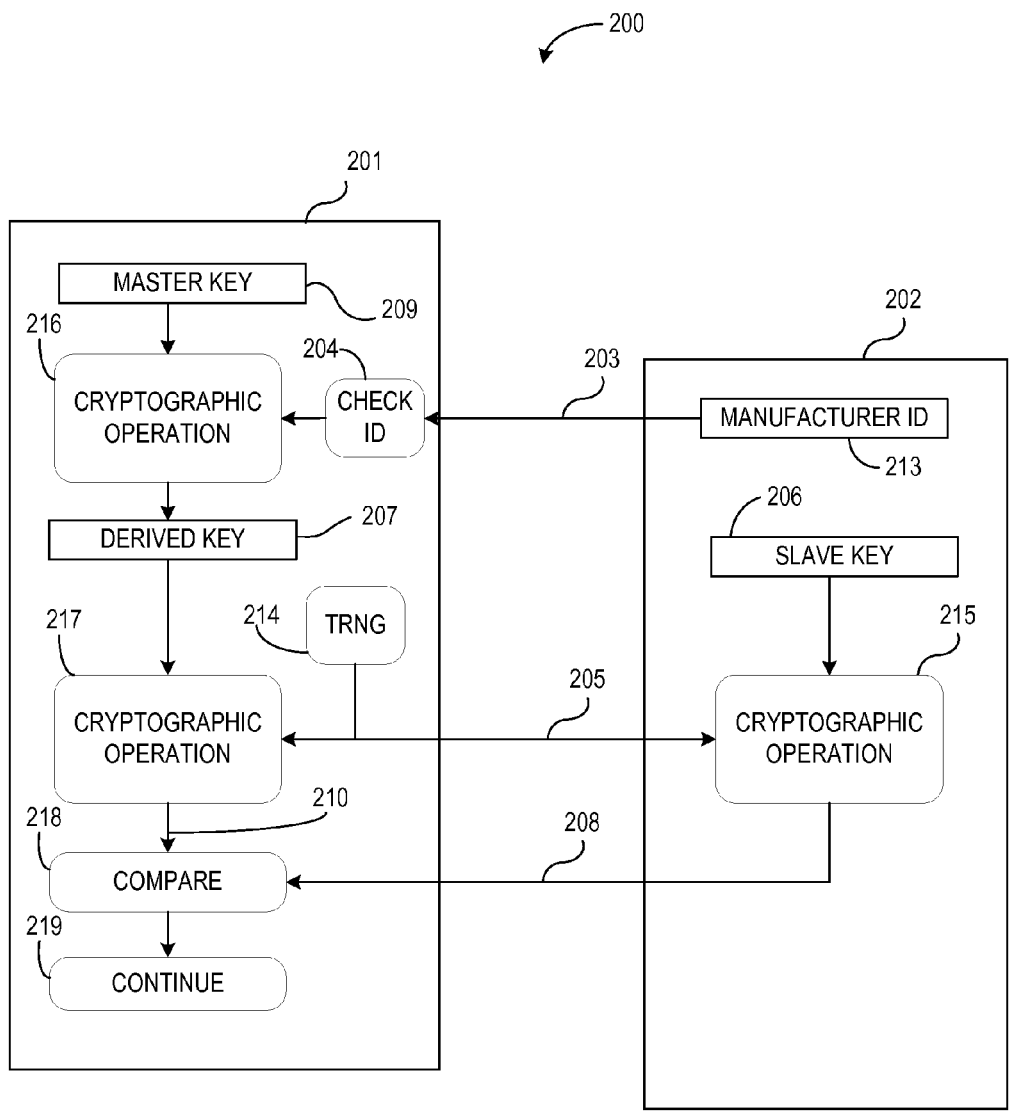
FIG. 2 illustrates generally an example master/slave system and an example authentication method.

FIG. 2 illustrates generally an example master/slave system 200 and method for authentication. In such a master/slave system 200, authentication of at least one of a master device 201 or a slave device 202 may be desired. Such authentication can minimize the chances that fraud, piracy or counterfeiting has occurred before the systems exchange communications. In an example, an authentication method can include the master device 201 requesting a first of a plurality manufacturer ID's from the slave device 202. At 203, the slave device 202 can send a first manufacturer ID 213 back to the master device 201. At 204, the master device 201 can check the first manufacturer ID 213 against a stored manufacturer revocation list. If the first manufacturer ID 213 is revoked, the master device 201 can request additional manufacturer ID's from the slave device 202. If all manufacturer ID's are revoked, the master device 201 can terminate communications with the slave device 202. If the first manufacturer ID 213 is valid and can be confirmed, the master device 201 can use a random number generator 214 to generate a true random number 205 and can send it to the slave device 202. The slave device 202 can perform a cryptographic operation 215, for example using a cryptography controller or a cryptography state machine circuit, and can encrypt the random number 205 using a slave key 206 associated with the first manufacturer ID 213 and can return a slave-encrypted random number 208 to the master device 201. The master device 201 can perform a cryptographic operation 216, for example using a cryptography controller or a cryptography state machine circuit, to derive a derived key 207 using a master key 209 and the received manufacturer ID 203. The master device 201 can perform a second cryptographic operation 217 to encrypt the random number 205 sent to the slave device 202 using the derived key 207 to provide a master-encrypted number 210. At 218, the master device 201 can compare the master-encrypted random number 210 to the slave-encrypted random number 208 that was received from the slave device 202. If the encrypted random numbers 208, 210 match, the accessory (slave device 202) is proven that it contains a valid slave key 206 and communication, at 219, can continue to allow the slave and master to operate together. If the encrypted random numbers 208, 210 do not match, the accessory (slave device 202) can be considered invalid and the communication channel can be terminated.

In certain examples, the master device 201 can identify the type of slave device 202 by, for example, identifying a resistance on an ID pin coupled to an interface (not shown) of the master device 201. After identifying the type of slave device 202, the authentication can proceed to, for example, assured that the slave device 202 is not a counterfeit, or has not accessed the master device 201 by some type of fraud or piracy.

In certain circuits and systems, read/writes, such as to non-volatile memory that store encryption data or keys, can generate deterministic electrical or electromagnetic patterns. Those patterns can be detected using probes that can detect current flow or changes in voltage levels. Such detected characteristics can be discriminated and correlated to known algorithm events. A power or EMI analysis of the operation of the circuit can show frequency content of the cryptography circuit activity for example. Further analysis of the frequency content can provide signatures that correlate to known encryption events and, as a result, greatly reduce the brute force iterations necessary for a hacker to derive a secret encryption key. Thus, the unbalanced frequency content of a power or EMI analysis of the circuit or system activity can give rise to identifying an encryption algorithm as well as an actual encryption key. Such power or EMI analysis techniques or side channel attack techniques can include simple power analysis, differential power analysis, and high-order differential power analysis. Such techniques are often passive, thus, a side channel attack is typically not detectable nor can one be prevented. Acquiring an encryption key can allow unauthorized parties to make unlicensed accessories that can lead to siphoning some of the potential profits from a product line, disrupting customer expectations with lower quality products, as well as other potentially damaging scenarios.

However, the present inventor has recognized that if the timing and execution pace of the authentication routine can be modulated, power consumption and EMI analysis will not expose the actual operation of the routine or the secret encryption keys used to execute the routine, even if the frequency content of a power analysis or EMI analysis is unbalanced. The iterative brut force effort of hackers appear to assume that the clock frequency and duty cycle are consistent during the execution of cryptographic and authentication algorithms.

Figure 3:
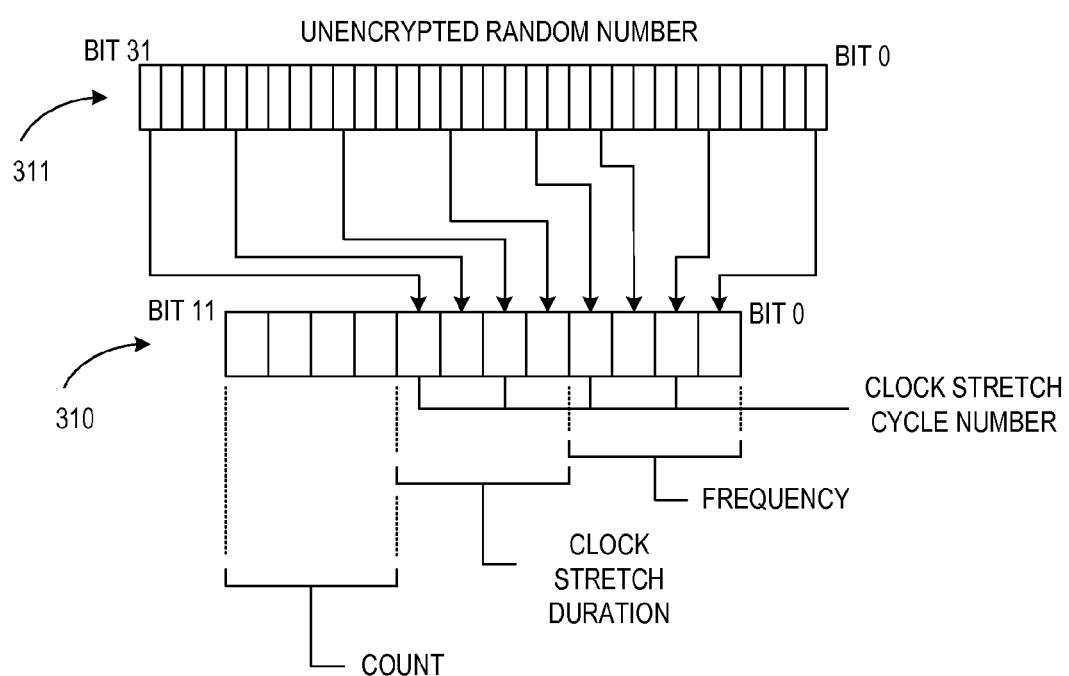
FIG. 3 illustrates generally an example register used to modulate authentication timing or pacing.

FIG. 3 illustrates generally an example defense register 310 used to modulate authentication timing or pacing. In certain examples, the defense register 310 can be a non-volatile memory (NVM) register. In some examples, a random number generator, such as a true random number generator (TRNG), can be used to provide a random number to a device register 311. In certain examples, predetermined bits or portions of the device register 311 can be parsed and used to a load values into the defense register 310. In certain examples, the defense register 310 can be refreshed with a new value at different times during or outside execution of an cryptographic or authentication algorithm. In some examples, the defense register 310 can be refreshed after a power-down reset (POR) or after an accessory attachment, or after an accessory detachment. The illustrated example defense register 310 can include a value or setpoint for setting the clock frequency (Frequency) during the execution of an authentication routine. In certain examples, the defense register 310 can include a pulse stretch duration setpoint parameter (Clock Stretch Duration) for applying a particular time lengthening of one or more clock cycles. In some examples, the defense register 310 can include a pattern setpoint parameter (Clock Stretch Cycle #) for applying a particular pattern of clock cycle stretching or lengthening.

In certain examples, the defense register 310 can maintain a count value (COUNT) indicating how many times the device has undergone a reset, such as a power down reset, an accessory attach authentication, or combination thereof with the same values in the parameter portion of the defense register 310. The count value can be used to shut down the authentication routine if the register values have not changed after a threshold number of resets or attach authentications. Hackers often need to perform many authentication iterations, such as iteratively looping TRNG's into a crypto block, to identify a cryptologic algorithm, authentication algorithm, or secret key using power consumption analysis or EMI analysis. An authentication shutdown as described above can prevent a large number of authentication executions from using the same values for authentication frequency, stretch duration, and stretch pattern.

In certain examples, as an authentication or cryptologic algorithm executes, the clock signal can change according to the values in the defense register 310 to prevent providing a power consumption analysis or EMI signature. Signal characteristics such as frequency, pulse stretch duration and pattern of pulse stretch can be used to provide the clock signal fluctuations. In manipulating the clock signal, power consumption analysis or EMI analysis of the device can be very different to interpret over several iterations even though the algorithm, data and key values used for each iteration are the same. Modulation of the clock signal during execution of the cryptographic or authentication algorithm can conceal the actual algorithm, data and keys from being detected through a side attack. In certain examples, pulse stretch can be analogous to varying the pulse width of one or more clock pulses using the pulse stretch duration parameter, or varying a duty cycle of the clock signal using the pulse stretch duration parameter.

It is understood that other register sizes and methods of transferring data to the defense register 310 from those illustrated in FIG. 3 are possible without departing from the scope of the present subject matter.

Figure 4:
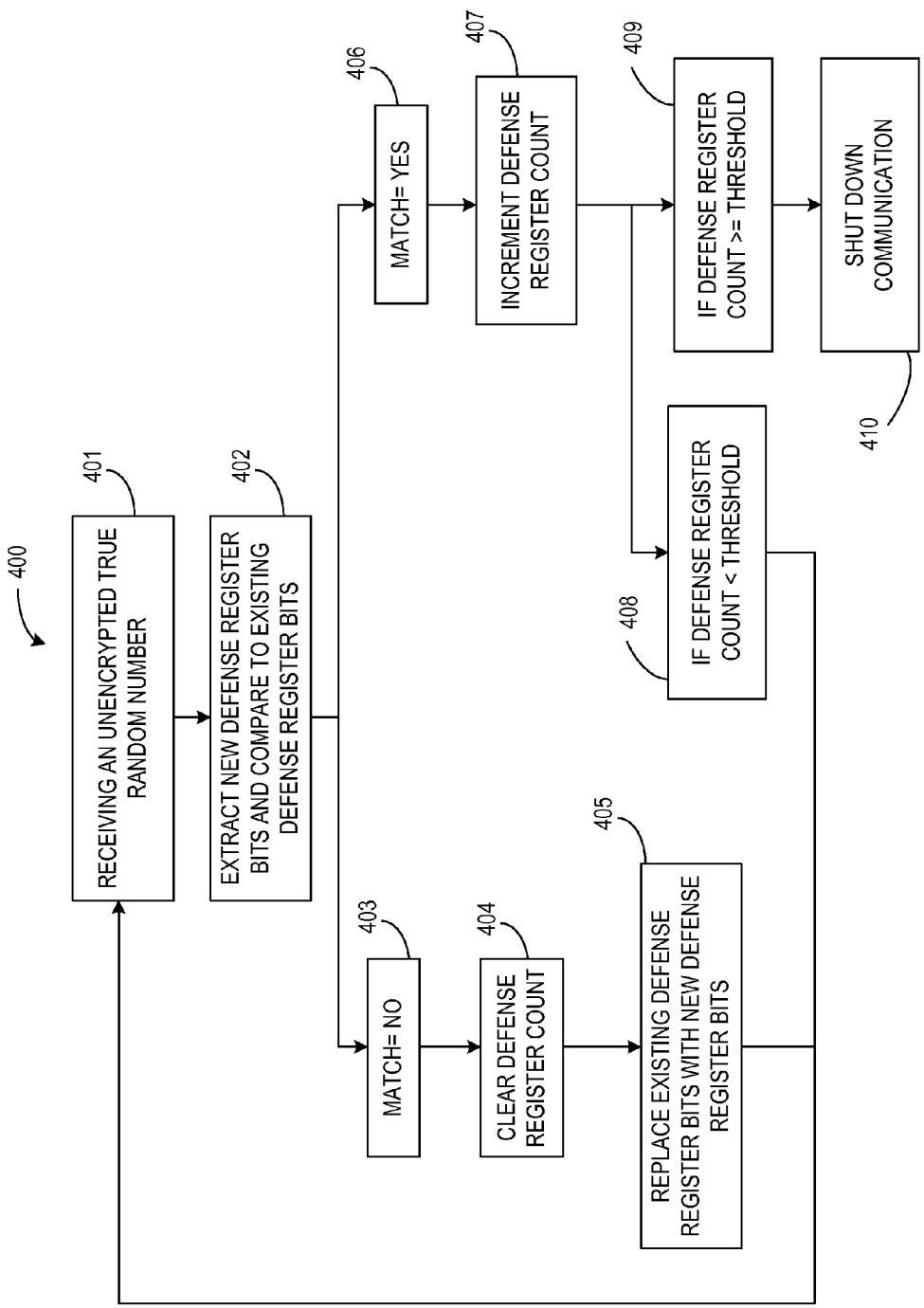
FIG. 4 illustrates generally an example method for assuring that a hacker has not frozen the register including the cryptographic frequency, pulse stretch duration and the pulse stretch pattern.

FIG. 4 illustrates generally an example method 400 for assuring that a hacker has not frozen the defense register (FIG. 3, 310) including the cryptographic frequency, pulse stretch duration and the pulse stretch pattern. In certain examples, the method 400 can include, at 401, receiving an unencrypted true random number from a random number generator at a device. At 402, the new defense register bits can be extracted from the random number and can be compared to the existing defense register bits. At 403 and 404, if the new defense register bits differ from the old defense register bits the count portion of the defense register can be reset. At 405 the new register bits are loaded into the register to replace the old register bits. At 406 and 407, if the new register bits match the old register bits, the count portion is incremented to the next count. In certain examples, the count portion may be incremented. In some examples, the count portion may be decremented. At 408, if the count portion does not satisfy a threshold count comparison, the method can loop back to wait for the next receipt of new register bits. At 409, if the count portion does satisfy the threshold count comparison, at 410, the communications or a communication path associated with the authentication devices can be terminated or shut down. In certain examples, the authentication or cryptographic controller can be terminated and can be prohibited from operating until certain other conditions are met. Shutting down the communication or the cryptographic controller can prevent an attacker from freezing the register to accomplish the number of brut force iterations necessary to determine the specific authentication algorithm, the data, or the keys. In certain examples, shutting down communications can include invalidating a manufacturer ID or invalidating a slave key such that other valid components can still be authenticated.

Additional Notes

In Example 1, a method of defending an electronic device against a side channel attack can include receiving first one or more parameters for altering a clock signal of the electronic device at a non-volatile memory register, and altering an operating characteristic of a clock of the electronic device during execution of an authentication routine according to the first one or more parameters.

In Example 2, the receiving the first one or more parameters of Example 1 optionally includes receiving a first random number at an authentication circuit; and the providing one or more portions of the random number to the non-volatile memory register.

In Example 3, the providing one or more portions of the random number of any one or more of Examples 1-2 optionally includes receiving a first portion of the one or more portions at the non-volatile memory, wherein the first portion includes a frequency setpoint for a cryptographic circuit clock.

In Example 4, the providing one or more portions of the random number of any one or more of Examples 1-3 optionally includes receiving a first portion of the one or more portions at the non-volatile memory, wherein the first portion includes a clock stretch duration setpoint for a cryptographic circuit.

In Example 5, the providing one or more portions of the random number of any one or more of Examples 1-4 optionally includes receiving a first portion of the one or more portions at the non-volatile memory, wherein the first portion includes a clock stretch cycle number setpoint for a cryptographic circuit, the cryptographic circuit configured to monitor.

In Example 6, the method of any one or more of Examples 1-5 optionally includes receiving second one or more parameters for altering a clock signal of the electronic device at the authentication circuit and comparing the second one or more parameters to the first one or more parameters.

In Example 7, the method of any one or more of Examples 1-6 optionally includes incrementing a count parameter of the non-volatile memory register if the second one or more parameters match the first one or more parameters.

In Example 8, the method of any one or more of Examples 1-7 optionally includes shutting down a communication path of the electronic device if a value of the count parameter exceeds a threshold.

In Example 9, the method of any one or more of Examples 1-8 optionally includes resetting the count parameter if the second one or more parameters do not match the first one or more parameters.

In Example 10, the method of any one or more of Examples 1-9 optionally includes receiving a second random number, comparing the second random number to the first random number, and incrementing a count parameter of the non-volatile memory register if the second random number matches the first random number.

In Example 11, the method of any one or more of Examples 1-10 optionally includes shutting down a communication path of the electronic device if a value of the count parameter exceeds a threshold.

In Example 12, the method of any one or more of Examples 1-11 optionally includes resetting the count parameter if the second random number does not match the first random number.

In Example 13, an apparatus can include an authentication circuit configured to receive a first random number from a first device, to parse portions of the first random number to a non-volatile memory register, and to modify one or more operating characteristics of a cryptography circuit of the authentication circuit using values stored within the non-volatile memory register.

In Example 14, the authentication circuit of any one or more of Examples 1-13 optionally is configured to set a frequency of a cryptography clock associated with the cryptography circuit using a first value stored within the non-volatile memory register.

In Example 15, the authentication circuit of any one or more of Examples 1-14 optionally is configured to set a clock stretch duration for a cryptography clock associated with the cryptography circuit using a first value stored within the non-volatile memory register.

In Example 16, the authentication circuit of any one or more of Examples 1-15 optionally is configured to set a clock stretch cycle number associated with the cryptography circuit using to a first value stored within the non-volatile memory register.

In Example 17, the authentication circuit of any one or more of Examples 1-16 optionally is configured to receive a second random number and to compare portions of the second random number to the parsed portions of the first random number.

In Example 18, the authentication circuit of any one or more of Examples 1-17 optionally is configured to increment a count parameter of the non-volatile memory register if the portions of the second random number match the parsed portions of the first random number.

In Example 19, the authentication circuit of any one or more of Examples 1-18 optionally is configured to reset the count parameter of the non-volatile memory register if the portions of the second random number do not match the parsed portions of the first random number.

In Example 20, the authentication circuit of any one or more of Examples 1-19 optionally is configured to shut down a communication path of the electronic device if a value of the count parameter exceeds a threshold.

Example 21 can include, or can optionally be combined with any portion or combination of any portions of any one or more of Examples 1 through 20 to include, subject matter that can include means for performing any one or more of the functions of Examples 1 through 20, or a machine-readable medium including instructions that, when performed by a machine, cause the machine to perform any one or more of the functions of Examples 1 through 20.

The above detailed description includes references to the accompanying drawings, which form a part of the detailed description. The drawings show, by way of illustration, specific embodiments in which the invention can be practiced. These embodiments are also referred to herein as "examples." All publications, patents, and patent documents referred to in this document are incorporated by reference herein in their entirety, as though individually incorporated by reference. In the event of inconsistent usages between this document and those documents so incorporated by reference, the usage in the incorporated reference(s) should be considered supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects. Method examples described herein can be machine or computer-implemented at least in part.

The above description is intended to be illustrative, and not restrictive. For example, the above-described examples (or one or more aspects thereof) may be used in combination with each other. Other embodiments can be used, such as by one of ordinary skill in the art upon reviewing the above description. The Abstract is provided to comply with 37 C.F.R. §1.72(b), to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description, with each claim standing on its own as a separate embodiment. The scope of the invention should be determined with reference to the appended claims, along with the full scope of equivalents to which such claims are entitled.

What is claimed is:

1. A method of defending an electronic device against a side channel attack, the method comprising:
    receiving first one or more parameters at an authentication circuit of the electronic device for altering a clock signal of the electronic device at a non-volatile memory register;
    altering a frequency of the clock signal of the electronic device during execution of an authentication routine according to the first one or more parameters;
    receiving second one or more parameters for altering the clock signal of the electronic device at the authentication circuit;
    comparing the second one or more parameters to the first one or more parameters;
    resetting a count parameter of the non-volatile memory register if the second one or more parameters do not match the first one or more parameters;

incrementing the count parameter of the non-volatile memory register if the second one or more parameters match the first one or more parameters; and shutting down a communication path of the electronic device if a value of the count parameter exceeds a threshold.

2. The method of claim 1 wherein receiving the first one or more parameters includes receiving a first random number at the authentication circuit; and wherein receiving the first one or more parameters includes providing one or more portions of the random number to the non-volatile memory register.

3. The method of claim 2, wherein providing the one or more portions of the random number includes receiving a first portion of the one or more portions at the non-volatile memory, wherein the first portion includes a frequency setpoint for a cryptographic circuit clock.

4. The method of claim 2, wherein providing the one or more portions of the random number includes receiving a first portion of the one or more portions at the non-volatile memory, wherein the first portion includes a clock stretch duration setpoint for a cryptographic circuit.

5. The method of claim 2, wherein providing the one or more portions of the random number includes receiving a first portion of the one or more portions at the non-volatile memory, wherein the first portion includes a clock stretch cycle number setpoint for a cryptographic circuit.

6. The method of claim 2, including wherein receiving the second one or more parameters includes receiving a second random number;

wherein comparing the second one or more parameters to the first one or more parameters includes comparing the second random number to the first random number; and incrementing the count parameter of the non-volatile memory register if the second random number matches the first random number.

7. The method of claim 6, including shutting down a communication path of the electronic device if a value of the count parameter exceeds a threshold.

8. The method of claim 6, wherein resetting the count parameter includes resetting the count parameter if the second random number does not match the first random number.

9. An apparatus comprising:

an authentication circuit configured to receive a first random number from a first device, to parse portions of the first random number to a non-volatile memory register, and to modify one or more operating characteristics of a cryptography circuit of the authentication circuit using values stored within the non-volatile memory register;

wherein the authentication circuit is configured to receive a second random number and to compare portions of the second random number to the parsed portions of the first random number;

wherein the authentication circuit is configured to increment a count parameter of the non-volatile memory register if the portions of the second random number match the parsed portions of the first random number;

wherein the authentication circuit is configured to reset the count parameter of the non-volatile memory register if the portions of the second random number do not match the parsed portions of the first random number; and wherein the authentication circuit is configured to shut down a communication path of the electronic device if a value of the count parameter exceeds a threshold.

10. The apparatus of claim 9, wherein the authentication circuit is configured to set a frequency of a cryptography clock associated with the cryptography circuit using a first value stored within the non-volatile memory register.

11. The apparatus of claim 9, wherein the authentication circuit is configured to set a clock stretch duration for a cryptography clock associated with the cryptography circuit using a first value stored within the non-volatile memory register.

12. The apparatus of claim 9, wherein the authentication circuit is configured to set a clock stretch cycle number associated with the cryptography circuit using a first value stored within the non-volatile memory register.

13. A method of defending an electronic device against a side channel attack, the method comprising:

receiving first one or more parameters for altering a clock signal of the electronic device at a non-volatile memory register;

altering a frequency of the clock signal of the electronic device during execution of an authentication routine according to the first one or more parameters;

receiving second one or more parameters for altering the clock signal of the electronic device at the authentication circuit; and incrementing a count parameter of the non-volatile memory register when the second random number matches the first random number shutting down a communication path of the electronic device when a value of the count parameter exceeds a threshold.

14. An apparatus comprising:

an authentication circuit configured to receive a first random number from a first device, to parse portions of the first random number to a non-volatile memory register, and to modify one or more operating characteristics of a cryptography circuit of the authentication circuit using values stored within the non-volatile memory register;

wherein the authentication circuit is configured to receive a second random number and to compare portions of the second random number to the parsed portions of the first random number;

wherein the authentication circuit is configured to increment a count parameter of the non-volatile memory register when the portions of the second random number match the parsed portions of the first random number; and wherein the authentication circuit is configured to shut down a communication path of the electronic device when a value of the count parameter exceeds a threshold.

* * * * *